(12) United States Patent
Yokoyama et al.

(10) Patent No.: US 6,361,081 B1
(45) Date of Patent: *Mar. 26, 2002

(54) DEVICE FOR FIXING LOWER MEMBERS AND FLUID CONTROL APPARATUS INCORPORATING SAME

(75) Inventors: Kosuke Yokoyama; Tsutomu Shinohara; Shigeru Itoi; Michio Yamaji; Tetsuya Kojima, all of Osaka (JP)

(73) Assignee: Fujikin Incorporated, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/440,570

(22) Filed: Nov. 15, 1999

(30) Foreign Application Priority Data

Nov. 16, 1998 (JP) ............................... 10-325638

(51) Int. Cl.[7] ................................ F16L 39/00
(52) U.S. Cl. .................. 285/124.3; 285/363; 285/906
(58) Field of Search .................. 285/47, 48, 50, 285/53, 54, 125.1, 124.1, 124.2, 124.3, 124.4, 124.5, 363, 906; 411/546, 383, 384

(56) References Cited

U.S. PATENT DOCUMENTS

| | | | | |
|---|---|---|---|---|
| 1,491,032 A | * | 4/1924 | Croker | 285/53 |
| 1,763,264 A | * | 6/1930 | Shanks | 411/546 X |
| 5,078,431 A | * | 1/1992 | Hale | 285/54 |
| 5,528,872 A | * | 6/1996 | Rotter | 52/748.1 |
| 5,860,676 A | * | 1/1999 | Brzezicki et al. | 285/125.1 |
| 5,944,360 A | * | 8/1999 | Crapart | 285/124.2 |
| 5,979,944 A | * | 11/1999 | Yokoyama et al. | 285/124.3 |
| 6,142,539 A | * | 11/2000 | Redemann et al. | 285/379 |

FOREIGN PATENT DOCUMENTS

DE     3641062     *    6/1988    ............. 285/48

* cited by examiner

Primary Examiner—Teri Pham Luu
(74) Attorney, Agent, or Firm—Armstrong, Westerman & Hattori, LLP

(57) ABSTRACT

Bolt bores in lower members each comprise a large-diameter portion larger than the head of a bolt in diameter, and a small diameter portion extending downward from the large-diameter portion with a stepped portion formed therebetween and having a diameter intermediate between the diameter of the bolt head and the diameter of the shank of the bolt. A heat insulator has a spacer inserting hole. A hollow cylindrical spacer having an inside diameter larger than the diameter of the bolt shank is inserted through the small-diameter portion of the bolt bore and the spacer inserting hole so that the upper end of the spacer is positioned in the large-diameter portion. The spacer has a lower end bearing on a support member. A hollow cylindrical elastic member is interposed between the bolt head and the stepped portion for biasing the lower member toward the support member.

4 Claims, 4 Drawing Sheets

DEVICE FOR FIXING LOWER MEMBERS AND FLUID CONTROL APPARATUS INCORPORATING SAME

BACKGROUND OF THE INVENTION

The present invention relates to a fixing device, for example, for use in fluid control apparatus which are assembled by fixing a plurality of couplings to a base plate and fixing on-off valves each to some of the couplings, the device being useful for fixing the couplings (lower members), to be disposed between the base plate (support member) and the on-off device (upper member), to the base plate (support plate).

The terms "upper" and "lower" as used herein refer respectively to the upper and lower sides of the drawings. However, these terms are used for the sake of convenience; the fixing device and the fluid control apparatus will be mounted on a horizontal surface, for example, in the illustrated state or as turned upside down, or may be attached to a vertical surface.

For example in fluid control apparatus for use in manufacturing semiconductors, etc., the lower members, i.e., coupling members having bolt bores, to be disposed between a support member and an upper member, i.e., an on-off valve, are fixed to the support member with bolts. To provide a fluid-tight joint between each lower member and the upper member in this case, a seal portion is formed between these members.

The conventional fluid control apparatus has the problem that when the lower members are fixed to the support member, the upper surfaces of the lower members are not always flush with each other, presenting difficulty in mounting the upper member on the lower members. If the upper member is mounted on the lower members with the upper surfaces of the lower members positioned at different levels, there arises the problem that different pressures acting on the seal portions produce a faulty seal.

To obviate this problem, we have proposed a fixing device for lower members as shown in FIG. 5 (see Japanese Patent Application 258075/1997).

The proposed device is adapted to fix lower members 31, 33 to a support member 108 with bolts 110, the lower members each having a bolt bore 107 and being disposed between the support member 108 and an upper member 7, the fixing device being characterized in that the bolt bore 107 of each of the lower members 31, 33 comprises a large-diameter portion 107a larger than the head 110a of the bolt in diameter, and a small diameter portion 107b extending downward from the large-diameter portion with a stepped portion 107c formed therebetween and having a diameter intermediate between the diameter of the bolt head 110a and the diameter of the shank 110b of the bolt, the small-diameter portion 107b of the bolt bore having fitted therein a hollow cylindrical spacer 111 with an inside diameter larger than the diameter of the bolt shank 110b, the spacer 111 having a lower end supported by the support member 108 and an upper end positioned in the large-diameter portion 107a, a hollow cylindrical elastic member 112 being interposed between the bolt head 110a and the stepped portion 107c for biasing the lower member toward the support member 108.

With fluid control apparatus having such lower member fixing devices, it is likely that a heater will be installed for preventing condensation of water vapor and for preventing re-liquefaction to be involved in passing a fluid, which is liquid at room temperature, as converted to a gas. In this case, a heat insulating material of Teflon (polytetrafluoroethylene=PTFE) or the like is interposed between the lower member which is made of stainless steel or like metal and the support member which is made of metal such as aluminum or stainless steel.

SUMMARY OF THE INVENTION

An object of the present invention is to provide a device for fixing lower members to a support member which device is suitable for use in interposing a heat insulating material between the support member and the lower members, and a fluid control apparatus having the fixing device incorporated therein.

The present invention provides a device for fixing lower members to a support member by bolts (110) with a heat insulator interposed between the support member and the lower members, the lower members each having a bolt bore and being disposed between the support member and an upper member, the fixing device being characterized in that the bolt bore of each of the lower members comprises a large-diameter portion larger than a head of the bolt in diameter, and a small diameter portion extending downward from the large-diameter portion with a stepped portion formed therebetween and having a diameter intermediate between the diameter of the bolt head and the diameter of a shank of the bolt, the heat insulator being formed with a spacer inserting hole, a hollow cylindrical spacer having an inside diameter larger than the diameter of the bolt shank and being inserted through the small-diameter portion of the bolt bore and the spacer inserting hole so that an upper end of the spacer is positioned in the large-diameter portion, the spacer having a lower end bearing on the support member, a hollow cylindrical elastic member being interposed between the bolt head and the stepped portion for biasing the lower member toward the support member.

The elastic member, which is preferably a rubber washer, may alternatively be a compression coil spring equivalent to the rubber washer in modulus of elasticity.

As each bolt of the lower member fixing device is tightened, the spacer is held between the bolt head and the support member, preventing further tightening. The elastic member biases the lower member toward the support member at this time, obviating the backlash of the lower member. On the other hand, the compression of the elastic member moves the lower member, having its upper surface positioned at a lower level than the other lower member, in a direction away from the support member, whereby the upper surfaces of the lower members can be made flush with each other. This renders the upper member easy to mount on the lower members. The heat insulator is more dependent on temperature and alters more markedly in properties with the lapse of time than the support member and the lower member which are both made of metal. It is accordingly likely that a clearance will be created between the heat insulator and the support member or the lower member, whereas even in such a case, the fixing device maintains a predetermined interval between the support member and the lower member, pressing the lower member against the support member with a suitable force to eliminate backlashes.

The lower member fixing device is suitable for use in fluid control apparatus which require a heater. For example, the lower members serve as couplings each having an upwardly open fluid channel, and the upper member as an on-off valve having two fluid channels which are open downward and communicate with the fluid channels of the lower members respectively, for use in the fluid control apparatus. A fluid channel is then formed which extends from one of the couplings to the other coupling by way of the on-off valve. The desired fluid control apparatus can be fabricated using such couplings, on-off valves and other fluid controllers in combination. Useful as the heater is, for example, a tape heater which is provided along, and in contact with, one or each of opposite side surfaces of at least one of the lower members, but the heater is not limited only to this type of heater.

In such fluid control apparatus, it is desirable to provide a seal between butting faces of each lower member and the upper member around the junction of the opposed fluid channels of these members. The lower members can then be joined to the upper member as made fluidtight by the seals, while the upper surfaces of the lower members can be rendered flush with each other, thereby permitting a uniform force to act on the seal portions.

DESCRIPTION OF THE PREFERRED EMBODIMENTS

Embodiments of the present invention will be described below with reference to the drawings.

Figure 1:
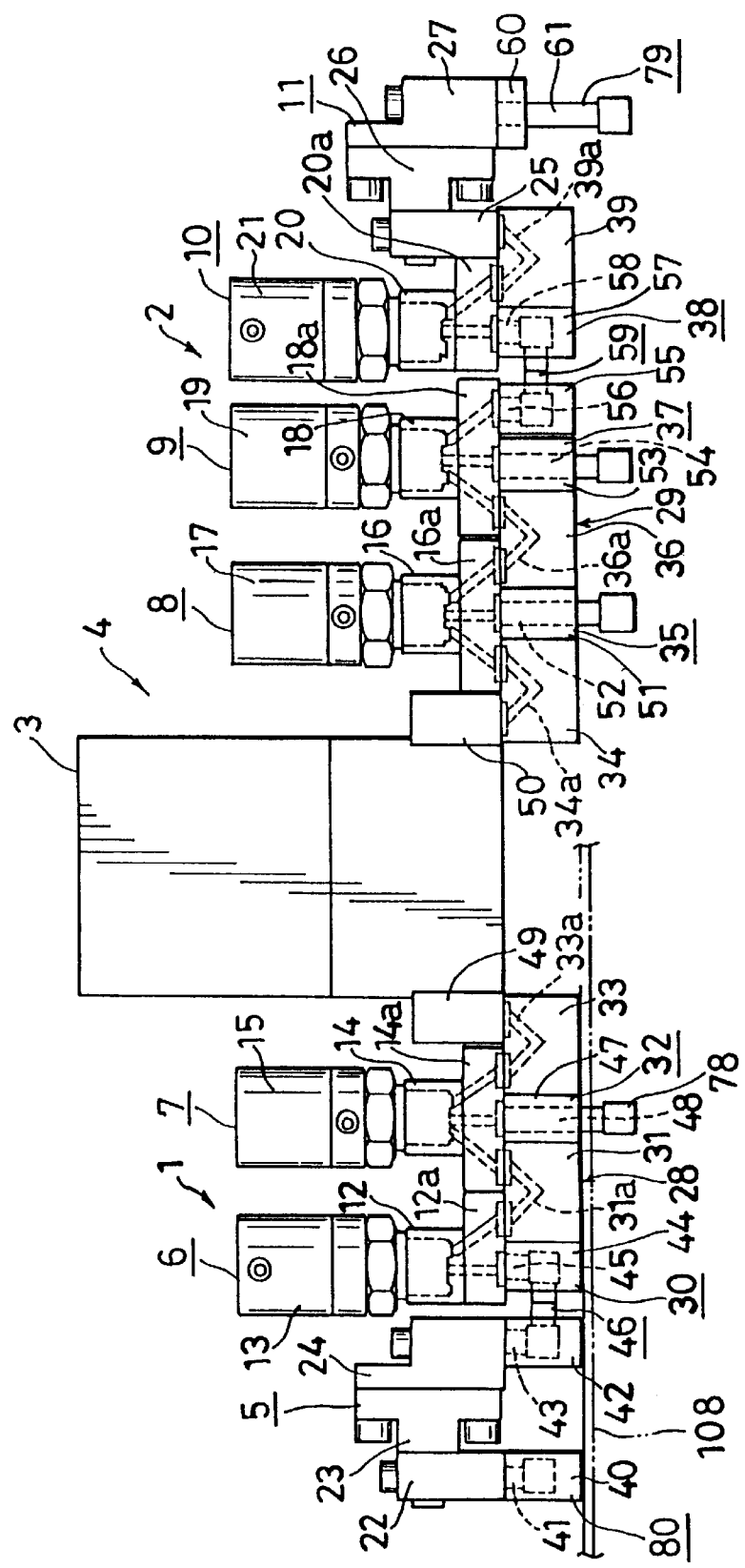
FIG. 1 is a front view showing an example of fluid control apparatus wherein lower member fixing devices of the invention are to be used.
Figure 2:
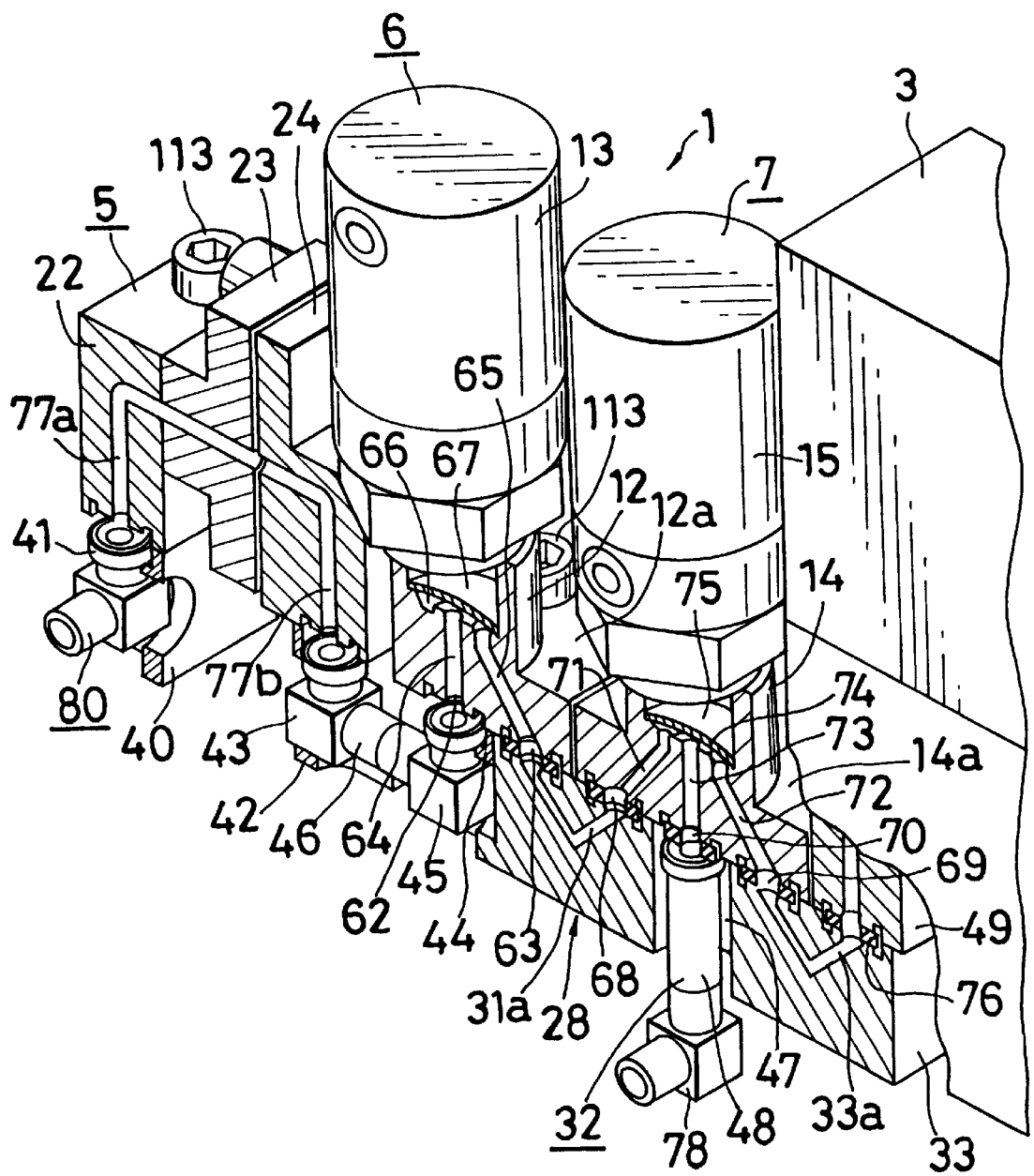
FIG. 2 is an exploded fragmentary perspective view partly broken away and showing the apparatus of FIG. 1 on an enlarged scale.

FIGS. 1 and 2 show an example of fluid control apparatus wherein the device of the invention is to be used. The fluid control apparatus 4 is adapted for use in semiconductor manufacturing equipment or the like and comprises a massflow controller 3, and shutoff-opening devices 1, 2 at the left and right of the controller 3.

The shutoff-opening device 1 at left comprises a first on-off valve 6 at left, a second on-off valve 7 at right and a first valve mount 28 having the two valves 6, 7 mounted thereon. The first valve mount 28 comprises a plurality of couplings 80, 30, 31, 32, 33 as will be described later. Disposed at the left of the left shutoff-opening device 1 is a first check valve 5.

The shutoff-opening device 2 at right comprises a third on-off valve 8 disposed at left, a fourth on-off valve 9 disposed at an intermediate position, a fifth on-off valve 10 disposed at right and a second valve mount 29 having these valve 8, 9, 10 mounted thereon. The second valve mount 29 comprises a plurality of couplings 34, 35, 36, 37, 38, 39, 79 as will be described later. Disposed at the right of the right shutoff-opening device 2 is a second check valve 11.

The on-off valves 6, 7, 8, 9, 10 comprise respective main bodies 12, 14, 16, 18, 20 and respective actuators 13, 15, 17, 19, 21 mounted thereon from above for suitably opening and closing a channel through each valve main body. The first and fifth on-off valves 6, 10 are two-port valves, while the second, third and fourth on-off valves 7, 8, 9 are three-port valves. The main bodies 12, 14, 16, 18, 20 of the on-off valves 6 to 10 are provided at their lower ends with flanges 12a, 14a, 16a, 18a, 20a, respectively, which are rectangular when seen from above.

Each of the check valves 5, 11 comprises a left main body 22 (25) having an inlet in its bottom face, a middle main body 23 (26) screwed to the main body 22 (25) and a right main body 24 (27) having an outlet in its bottom face and fastened with screws to the middle main body 23 (26).

The massflow controller 3 is formed on the left side of its lower end with a rectangular parallelepipedal leftward extension 49 having an inlet in its bottom face, and on the right side of its lower end with a rectangular parallelepipedal rightward extension 50 having an outlet in its bottom face.

The bottom faces of the valve main bodies 22, 23, 24, 12, 14 at the left of the massflow controller 3 and the bottom face of the leftward extension 49 of the controller 3 are all flush with one another. The rightward extension 50 of the controller 3 and the valve main bodies 16, 18, 20, 25, 26, 27 have their bottom faces positioned all flush with one another.

The inlet of left main body 22 of the first check valve 5 is provided with a purge gas supply coupling 80 connected to a purge gas supply line and comprising a holding member 40 and an L-shaped channel member 41 held by the member 40.

The outlet of right main body 24 of the first check valve 5 is held in communication with an inlet of main body 12 of the first on-off valve 6 by a first inflow channel coupling 30 for introducing a fluid into the left shutoff-opening device 1. The coupling 30 comprises two holding members 42, 44 and a U-shaped communication channel member 46 held by these members 42, 44 and comprising two L-shaped channel members 43, 45 which are joined to each other.

Opposed to both the bottom face of rightward portion of main body 12 of the first on-off valve 6 and the bottom face of leftward portion of main body 14 of the second on-off valve 7 is a coupling 31 in the form of a rectangular parallelepipedal block for forming a first communication channel and having a V-shaped channel 31a for causing an outlet of the valve 6 to communicate with an inlet of the valve 7.

The main body 14 of the second on-off valve 7 has an inlet-outlet subopening, which is provided with a first subchannel coupling 32 comprising a holding member 47 and an I-shaped channel member 48 and held by the member 47. Attached to the lower end of the coupling 32 is a known L-shaped coupling 78 connected to a process gas supply line.

Disposed beneath both the rightward portion of main body 14 of the valve 7 and the leftward extension 49 of the massflow controller 3 is a coupling 33 in the form of a rectangular parallelepipedal block for forming a first outflow channel and having a V-shaped channel 33a for sending a fluid from the outlet of the valve 7 to the controller 3.

Disposed beneath both the bottom face of rightward extension 50 of the massflow controller 3 and the bottom face of leftward portion of main body 16 of the third on-off valve 8 is a coupling 34 in the form of a rectangular parallelepipedal block for forming a second inflow channel and having a V-shaped channel 34a for introducing a fluid from the controller 3 into the right shutoff-opening device 2.

The main body 16 of the third on-off valve 8 has an inlet-outlet subopening, which is provided with a second subchannel coupling 35 connected to an evacuating line and comprising a holding member 51 and an L-shaped channel member 52 and held by the member 51.

Disposed beneath both the bottom face of rightward portion of main body 16 of the third on-off valve 8 and the bottom face of leftward portion of main body 18 of the fourth on-off valve 9 is a coupling 36 in the form of a rectangular parallelepipedal block for forming a second communication channel and having a V-shaped channel 36a for causing an outlet of the valve 8 to communicate with an inlet of the valve 9.

The main body 18 of the fourth on-off valve 9 has an inlet-outlet subopening, which is provided with a third subchannel coupling 37 connected to a process gas supply line and comprising a holding member 53 and an L-shaped channel member 54 and held by the member 53.

An outlet of main body 18 of the fourth on-off valve 9 is held in communication with an inlet of main body 20 of the fifth on-off valve 10 by a third communication channel coupling 38, which comprises two holding members 55, 57 and a communication channel member 59 held by these members. The member 59 comprises two L-shaped channel members 56, 58 joined to each other.

Disposed beneath both the bottom face of rightward portion of main body 20 of the fifth on-off valve 10 and the bottom face of left main body 25 of the second check valve 11 is a coupling 39 in the form of a rectangular parallelepipedal block for forming a second outflow channel and having a V-shaped channel 39a for causing an outlet of the valve 10 to communicate with the inlet of the valve 11.

The outlet of right main body 27 of the second check valve 11 is provided with a purge gas discharge coupling 79 connected to a purge gas discharge line and comprising a holding member 60 and an L-shaped channel member 61 held by the member 60.

The first inflow channel coupling 30, first communication channel coupling 31, first subchannel coupling 32 and first outflow channel coupling 33 which are positioned at the left side of the controller 3 form the first valve mount 28 of the left shutoff-opening device 1. The second inflow channel coupling 34, second subchannel coupling 35, second communication channel coupling 36, third subchannel coupling 37, third communication channel coupling 38 and second outflow channel coupling 39 which are positioned at the right side of the controller 3 provide the second valve mount 29 of the right shutoff-opening device 2.

According, the left shutoff-opening device 1 has a purge gas channel through which a purge gas admitted through the check valve 5 is discharged via the first inflow channel coupling 30, the main body 12 of the first on-off valve 6, the first communication channel coupling 31, the main body 14 of the second on-off valve 7 and the first outflow channel coupling 33, and a process gas channel through which a process gas admitted from the bottom face of the first subchannel coupling 32 is discharged via the coupling 32, the main body 14 of the second on-off valve 7 and the first outflow channel coupling 33. The right shutoff-opening device 2 has a purge gas channel through which the purge gas introduced via the controller 3 is discharged by way of the second inflow channel coupling 34, second communication channel coupling 36, third communication channel coupling 38 and second outflow channel coupling 39; a process gas channel through which the process gas admitted through the controller 3 is fed to a process chamber via the second inflow channel coupling 34, second communication channel coupling 36 and third subchannel coupling 37; and an evacuating channel for drawing off the gas from these channels via the second subchannel coupling 35.

As shown on an enlarged scale in FIG. 2, the first check valve 5 has an inflow channel 77a and an outflow channel 77b which are opened downward. The main body 12 of the first on-off valve 6 is formed in its bottom face with an inlet 62 positioned approximately centrally thereof, and an outlet 63 positioned at right. The valve main body 12 is internally formed with an inflow channel 64 extending from the inlet 62 to a valve chamber 66, and an outflow channel 65 extending from the outlet 63 to the chamber 66. The actuator 13 of the first on-off valve 6 serves to operate a valve element 67 in the form of a diaphragm. When operated, the actuator 13 opens or closes the inflow channel 64 with the valve element 67. The main body 14 of the second on-off valve 7 is formed in its bottom face with an inlet 68 at left, an outlet 69 at right and an inlet-outlet subopening 70 positioned approximately in the center to serve as an inlet or outlet for other fluid. The valve main body 14 is internally formed with an inflow channel 71 extending from the inlet 68 to a valve chamber 74, a subchannel 73 extending from the subopening 70 to the chamber 74 and an outflow channel 72 extending from the outlet 69 to the chamber 74. The actuator 15 of the second on-off valve 7 serves to operate a valve element 75 in the form of a diaphragm. When operated, the actuator 15 opens or closes the subchannel 73 with the valve element 75. The inflow channel 71 extending to the inlet 68 of the second on-off valve 7 is always in communication with the outflow channel 72 extending to the outlet 69 through the valve chamber 74.

A seal 76 as shown in FIG. 2 is provided between each of the valve main bodies 22, 23, 24, 12, 14, 16, 18, 20, 25, 26, 27 and at least one of the members 41, 30, 31, 32, 33, 34, 35, 36, 37, 38, 39, 61 joined thereto in butting contact. The check valves 5, 11 and the on-off valves 6, 7, 8, 9, 10 are each fastened to at least one of the couplings 80, 30, 31, 32, 33, 34, 35, 36, 37, 38, 39, 79 opposed thereto with a bolt 113 screwed into the main body 22, 23, 24, 12, 14, 16, 18, 20, 25, 26 or 27 (see FIG. 2). The check valves 5, 11 and the on-off valves 6 to 10 can be removed upward by removing these bolts 113. In construction, the second check valve 11 is identical with the first check valve 5, the fifth on-off valve 10 with the first on-off valve 6, and the third and fourth on-off valves 8, 9 with the second on-off valve 7.

With the fluid control apparatus 4, the process gas is admitted into the first subchannel coupling 32 of the left shutoff-opening device 1, with the first on-off valve 6 closed, the second on-off valve 7 held open, the third on-off valve 8 closed, the fourth on-off valve 9 held open and the fifth on-off valve 10 closed, whereupon the process gas flows through the main body 14 of the second on-off valve 7 and the first outflow channel coupling 33 into the massflow controller 3, wherein the gas has its flow rate regulated. The gas is then admitted into the right shutoff-opening device 2, thereafter flows through the second inflow channel coupling 34, the main body 16 of the third on-off valve 8, the second communication channel coupling 36, the main body 18 of the fourth on-off valve 9 and the third subchannel coupling 37 and is sent into the process chamber. When the purge gas is thereafter admitted into the first check valve 5, with the first on-off valve 6 held open, the second on-off valve 7 closed, the third on-off valve 8 closed, the fourth on-off valve 9 closed and the fifth on-off valve 10 held open, the purge gas flows through the first inflow channel coupling 30, the main body 12 of the first on-off valve 6, the first communication channel coupling 31, the main body 14 of the second on-off valve 7 and the first outflow channel coupling 33, reaches the massflow controller 3, further flows through the second inflow channel coupling 34, the main body 16 of the third on-off valve 8, the second communication channel coupling 36, the main body 18 of the fourth on-off valve 9, the third communication channel coupling 38, the main body 20 of the fifth on-off valve 10, second outflow channel coupling 39 and the second check valve 11, and is discharged. At this time, the purge gas drives out with its own pressure the process gas remaining in the main body 14 of the second on-off valve 7, first outflow channel coupling 33, second inflow channel coupling 34 and second communication channel coupling 36, with the result that purge gas only flows through the apparatus in a short period of time.

With the shutoff-opening devices 1, 2, the first in flow channel coupling 30 and the third communication channel coupling 38 are common members, the first communication channel coupling 31, first outflow channel coupling 33, second inflow channel coupling 34, second communication channel coupling 36 and second outflow channel coupling 39 are common members, and subchannel couplings 32, 35, 37 are also common members. In other words, the right shutoff-opening device 2 is available only by adding one three-port on-off valve to the left shutoff-opening device 1 and adding to the valve mount 28 thereof the same members as the first communication channel coupling 31 and the first subchannel coupling 32. When the on-off valve to be added is a two-port valve, the fourth on-off valve 9 of the right shutoff-opening device 2 is replaced by a two-port valve, with the third subchannel coupling 37 removed from the mount 29. Thus, the left and right shutoff-opening devices 1 and 2 are amenable to various modifications.

With the embodiment shown in FIG. 1, the left shutoff-opening device 1 has two on-off valves 6, 7, while the right shutoff-opening device 2 has three on-off valves 8, 9, 10, whereas the number of on-off valves is variable suitably. Two shutoff-opening devices each having a suitable number of on-off valves are arranged respectively at the left and right sides of a massflow controller, and such arrangements are further arranged in parallel to provide a fluid control apparatus for use in semiconductor manufacturing equipment. The fluid control apparatus is installed by mounting the couplings 80, 30, 31, 32, 33, 34, 35, 36, 37, 38, 39 on a base plate 108 with bolts, attaching the fluid controllers, such as check valves 5, 11, on-off valves 6, 7, 8, 9, 10 and massflow controller 3, to the couplings 80, 30 to 39 with bolts and fixing the base plate 108 in position.

Figure 3:
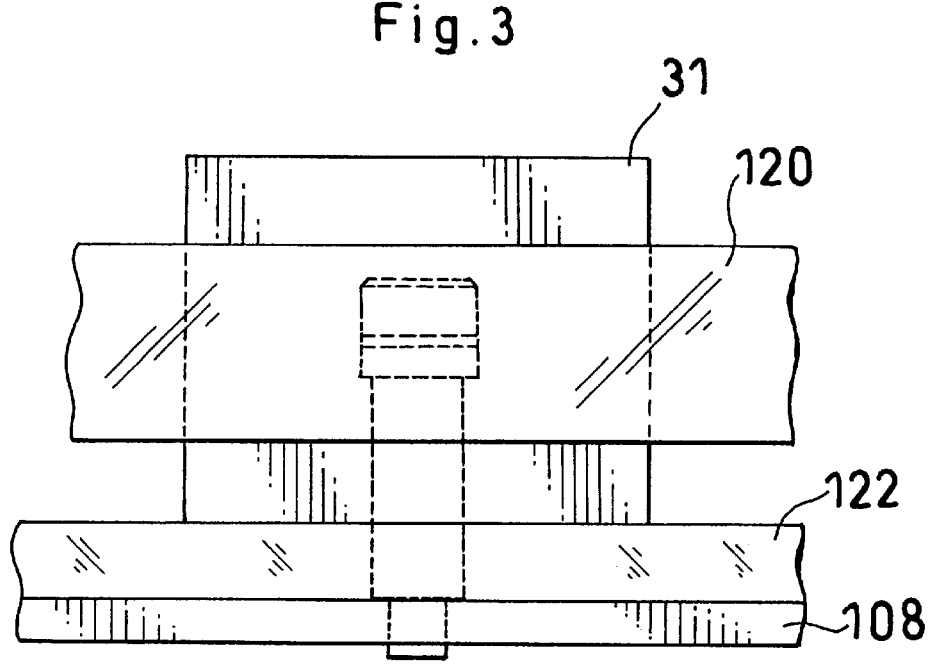
FIG. 3 is a side elevation showing a portion of the fluid control apparatus wherein the lower member fixing device is to be used.

When desired, the fluid control apparatus 4 described is provided with a heater for preventing condensation of water vapor and for preventing re-liquefaction to be involved in passing a fluid, which is liquid at room temperature, as converted to a gas. FIG. 3 shows an example of arrangement in such a case. At least one coupling member 31 is provided with a tape heater 120 in contact with one or each of its opposite sides, and a heat insulator 122 of Teflon (polytetrafluoroethylene, PTFE) is interposed between the coupling member 31 and the base plate 108 which are both made of stainless steel.

Figure 4:
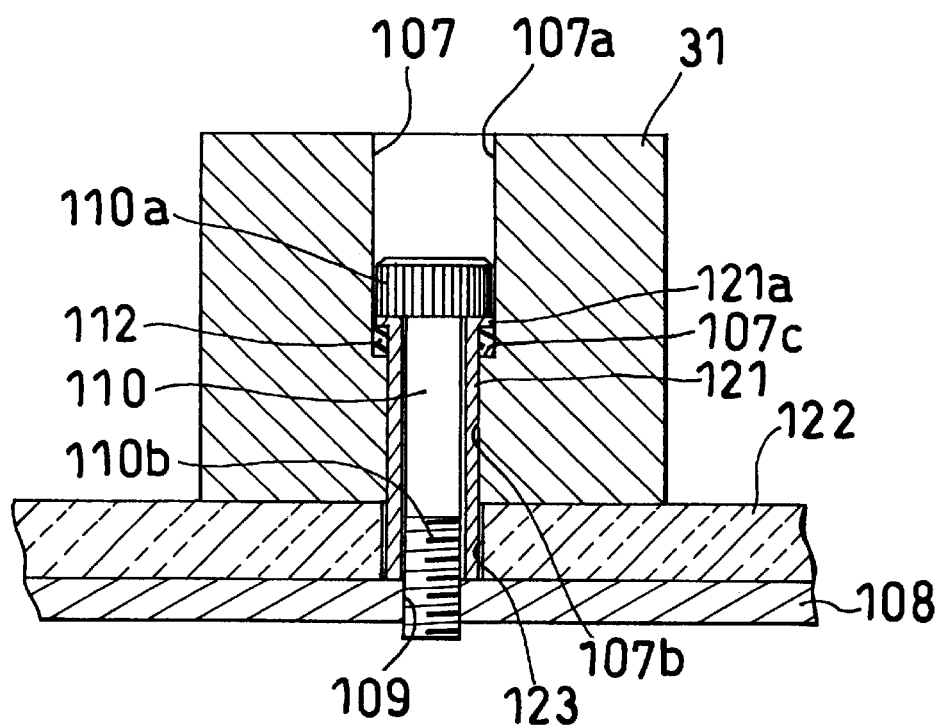
FIG. 4 is a sectional view showing the lower member fixing device of the invention.
Figure 5:
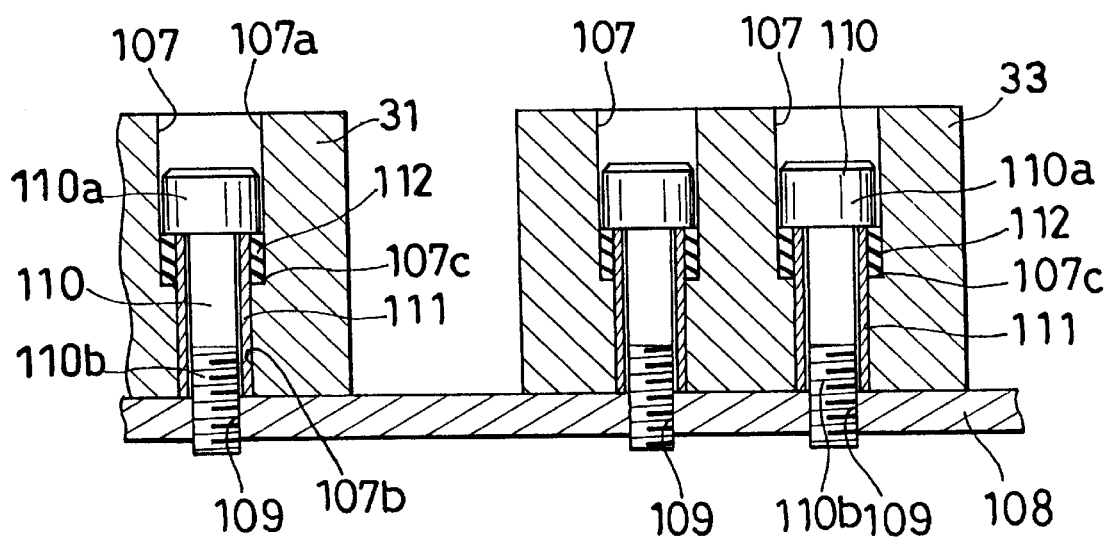
FIG. 5 is a sectional view showing a conventional lower member fixing device.

FIG. 4 shows a lower member fixing device of the invention, i.e., a device for fixing the coupling (lower member) 31 to be disposed between a base plate (support member) 108 and fluid controllers (upper members) to the base plate with bolts. The device is suitable for use in interposing a heat insulator 122 between the coupling 31 and the base plate 108.

With reference to FIG. 4, the block coupling 31 for mounting the on-off valves 6, 7 thereon is attached to the base plate 108, with the heat insulator interposed therebetween. A screw bore for use in attaching the block coupling 31 to the on-off valve main body is formed in the upper side of the coupling 31 at each of four corners thereof (not shown). A bolt bore 107 for inserting the coupling fixing bolt 110 therethrough for attaching the block coupling 31 to the base plate 108 is formed at each of portions of the coupling 31 close to its central portion. The base plate 108 is formed with screw bores 109 for use in attaching the block coupling 31 to the base plate 108.

The bolt bore 107 of the block coupling 31 comprises a large-diameter portion 107a having a diameter larger than the diameter of the head 110a of the coupling fixing bolt 110, and a small-diameter portion 107b continuous with the portion 107a, with a stepped portion 107c provided therebetween, and having an inner diameter intermediate between the diameter of the bolt head 110a and the diameter of the shank 110b of the bolt.

Fitted in the small-diameter portion 107b of the bolt bore 107 is a hollow cylindrical spacer 121 having a lower end inserted in a spacer hole 123 in the heat insulator 122 and bearing on the base plate 108, and an upper end positioned in the large-diameter portion 107a. The spacer 121 has an inside diameter larger than the diameter of the bolt shank 110b and an outside diameter smaller than the diameter of the bolt head 110a. The spacer 121 is formed at its upper end with a flange 121a having an outside diameter approximately equal to the diameter of the large-diameter portion 107a of the bolt bore 107. The shank 110b of the coupling fixing bolt 110 is fitted in the spacer 121, with the bolt head 110a bearing on the upper surface of flange 121a of the spacer 121. The spacer 121 serves to determine the amount of tightening of the coupling fixing bolt 110, such that as the bolt 110 inserted through the bore 107 is screwed into the screw bore 109 of the base plate 108, the head 110a of the bolt 110 is supported by the spacer 121 bearing on the base plate 108, preventing further tightening of the bolt.

An annular rubber washer 112 having an outside diameter approximately equal to the diameter of the large-diameter portion 107a of the bolt bore 107 is fitted around the upper end of the spacer 121. The upper end of the rubber washer 112 is in contact with the lower surface of the spacer flange 121a. Thus the rubber washer 112 is held between the flange 121a of the spacer 121 and the stepped portion 107c of the bolt bore 107. The upper end of the rubber washer 112 may of course be caused to bear against the lower face of head 110a of the coupling fixing bolt 110 without providing the flange 121a on the spacer 121. The vertical length of the rubber washer 112 is so determined that a compressive force will act on the washer 112 when the bolt 110 is completely tightened up in the state shown in FIG. 4. Accordingly, the coupling 31 is biased toward the base plate 108 by the rubber washer 112. The rubber washer 112, which is elastic, can be further deformed by compression, so that the coupling 31 is movable away from the base plate 108. Accordingly, even if the upper surface of the coupling 31 is not flush with that of another coupling, the couplings are brought closer to the on-off valve 7 as the on-off valve 7 is fastened to the couplings with the coupling fixing bolts 110, which can therefore be tightened up easily. Consequently, all the seals 76 can be subjected to a proper pressure to ensure fluid tightness.

With the fluid control apparatus 4 described, it becomes frequently necessary to temporarily remove some or all of the massflow controller 3, check valves 5, 11 and on-off valves 6, 7, 8, 9, 10 and to install the removed components again for repair or replacement. The heat insulator 122 is made of a synthetic resin and therefore has the characteristics that the variation in the thickness thereof is more dependent on temperature and occurs more markedly with the lapse of time than in the case of the base plate 108 and the coupling 31 which are both made of metal. It is accordingly likely that a clearance will be created between the heat insulator 122 and the base plate 108 or the coupling 31, whereas even in such a case, the lower member fixing device of the present invention maintains a predetermined interval between the base plate 108 and the coupling 31, pressing the coupling 31 against the base plate 108 with a suitable force with the elastic member 112 and the spacer 121 provided therebetween. Consequently even if the massflow controller 3, check valves 5, 11 and on-off valves 6, 7, 8, 9, 10 are repeatedly removed and installed, these components can be attached to the base plate 108 free of backlashes without being influenced by variations in the thickness of the heat insulator 122.

What is claimed is:

1. A device for fixing lower members (31), (33) to a support member (108) by bolts (110) with a heat insulator (122) interposed between the support member (108) and the lower members (31), (33) each having a bolt bore (107) and being disposed between the support member (108) and an upper member (7), the fixing device being characterized in that the bolt bore (107) of each of the lower members (31), (33) comprises a large-diameter portion (107*a*) larger than a head (110*a*) of the bolt in diameter, and a small diameter portion (107*b*) extending downward from the large-diameter portion with a stepped portion (107*c*) formed therebetween and having a diameter intermediate the diameter of the bolt head (110*a*) and the diameter of a shank (110*b*) of the bolt, the heat insulator (122) being formed with a spacer inserting hole (123), a hollow cylindrical spacer (121) having an inside diameter larger than the diameter of the bolt shank (110*b*) and being inserted through the small-diameter portion (107*b*) of the bolt bore and the spacer inserting hole (123) so that an upper end of the spacer (121) is positioned in the large-diameter portion (107*a*) of the bolt bore, the spacer (121) penetrating through the spacer inserting hole (123) in the heat insulator and having a lower end bearing on the support member (108), and a hollow cylindrical elastic member (112) being interposed between the bolt head (110*a*) and the stepped portion (107*c*) for biasing the lower member (31), (33) toward the support member (108).

2. A fluid control apparatus comprising a device according to claim 1 for fixing lower members, an upper member and a heater for heating at least one lower member.

3. A fluid control apparatus according to claim 2 wherein the lower members (31), (33) are provided with upwardly open fluid channels (31*a*), (33*a*) respectively, and the upper member (7) is provided with two downwardly open fluid channels (71), (72) communicating with the fluid channels (31*a*), (33*a*) of the lower members (31), (33) respectively.

4. A fluid control apparatus according to claim 3 wherein a seal (76) is provided between a butting face of the upper member (7) and each butting face of the respective lower members (31), (33) around a junction of the fluid channel (71), (72) and the fluid channel (31*a*), (33*a*).

* * * * *